July 15, 1969     R. J. SEMANCHIK     3,455,199
EYE-PIN FASTENERS
Filed Jan. 19, 1968
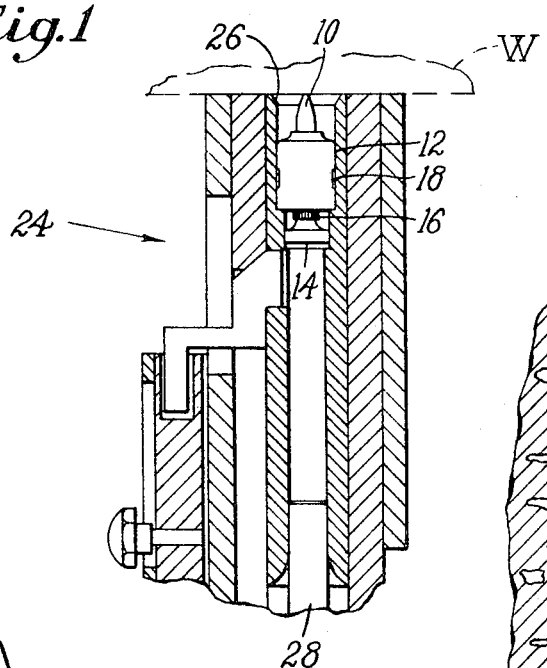
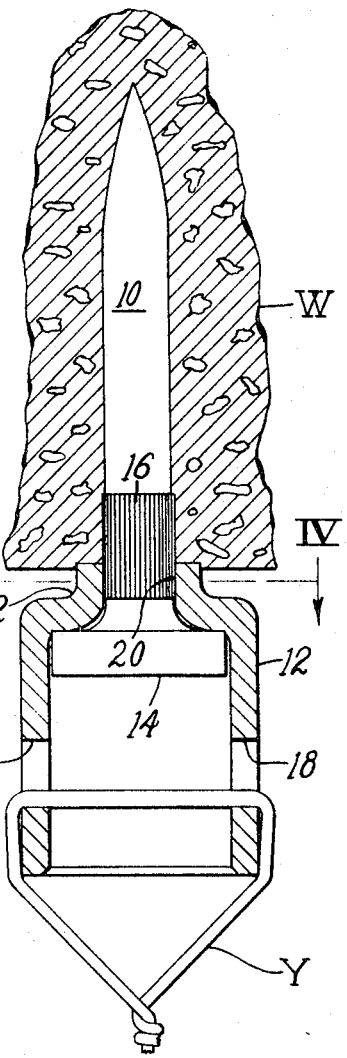
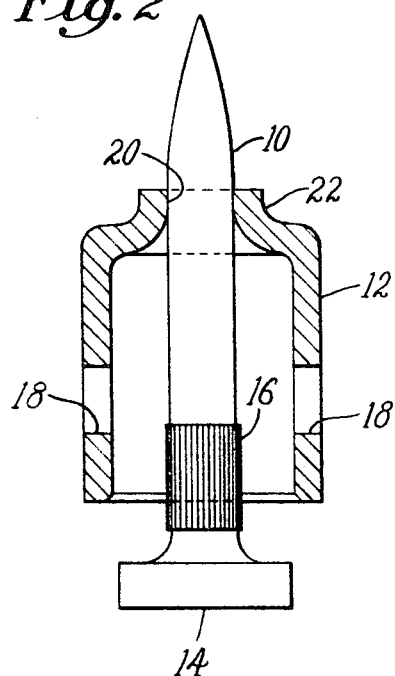
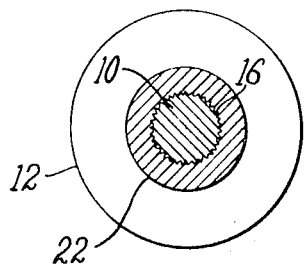
*Inventor*
Robert J. Semanchik
By his Attorney
Carl E. Johnson.

United States Patent Office 3,455,199
Patented July 15, 1969

3,455,199
EYE-PIN FASTENERS
Robert J. Semanchik, Shelton, Conn., assignor to USM Corporation, Flemington, N.J., a corporation of New Jersey
Filed Jan. 19, 1968, Ser. No. 699,245
Int. Cl. F16b 15/00; E04c 5/12; E04g 3/08
U.S. Cl. 85—10                                2 Claims

ABSTRACT OF THE DISCLOSURE

A two-part fastener mountable in a hard work piece, for instance a wood, concrete or steel ceiling member, comprises a cup-shaped member having a collar and a headed drive pin telescoped therein. On being driven relatively to the cup member, preferably by an explosively actuated tool, an axially ribbed or serrated shank portion of the pin is forced axially through the collar to deform it internally and anchor the cup in relatively non-rotating position. The head of the drive pin is engageable with an inner portion of the collar thus to clamp it and prevent overdrive of the pin into the work.

Background of the invention

This invention pertains to fastener devices, especially of the elongated type, adapted to be inserted by endwise impact into supporting structure for the purpose of supporting a load. More especially the invention is concerned with the provision of a composite fastener including a hollow support or holder having an aperture in one end, and a nail-like fastener having a head and a shank, the shank having one or more axially extending radial projections disposed to deform a wall of the aperture in the holder on being driven therethrough to secure the holder in a relatively non-rotary position. The fastener has particular advantage in suspending structural members or other devices from ceilings.

Samples of an explosively driven fastener of the general type to which the present invention is related are shown in FIGS. 5 to 8 inclusive of United States Letters Patent 2,724,116, issued in the name of P. Termet on Nov. 22, 1955. The usual single piece constructions of this type have several drawbacks amongst which may be mentioned that they are (1) slower to produce, (2) potentially weaker in holding power and, (3) insufficiently versatile in that each fastener is limited to a particular operating condition when in fact both the hardness of the mounting material and particular sizes of the articles to be secured thereto vary.

It accordingly is a primary object of the present invention to provide an improved economical, single-blow type load-supporting fastener wherein a tubular support is nonrotatively locked upon an axially driven nail-type fastener during installation, longitudinally extending projections on the shank of the fastener being telescoped into one end of the support and enabling the latter to prevent overdrive of the nail-like fastener into the work.

Brief description of the drawings

The foregoing and other features of the invention will now be more particularly described in connection with an illustrative embodiment, and with reference to the accompanying drawings thereof, in which:

FIG. 1 is an axial section of the muzzle end of an explosively actuated tool loaded with the fastener of this invention and ready to effect its installation;

FIG. 2 is an enlarged axial section of the two-piece fastener shown in FIG. 1;

FIG. 3 is a view similar to FIG. 2 but showing the fastener assembly after it has been driven into concrete, a wire loop being shown suspended by way of illustration for supporting a load; and FIG. 4 is a transverse section taken on the line IV—IV of FIG. 3.

The terms "cup-shaped member" and "drive pin," or the like, as used herein are intended to include their respective equivalents in a comprehensive sense, the "member" referring for instance to any sleeve-like or tubular support or receptacle, and the "drive pin" including such elongated fasteners as threaded studs, for example.

Description of the preferred embodiments

Referring first to FIG. 2, the composite fastener includes a nail-like drive pin 10 telescopically received in a cup-shaped supporting member 12, opposite ends of the pin preferably protruding axially as shown. For a purpose hereinafter explained the shank of the pin 10 has longitudinally extending ribs or serrations 16 adjacent its head 14 and disposed circumferentially in a guide bore 20 having a diameter slightly larger than the internal diameter of a collar portion 22 of the cup 12. Desirably the ribs 16 are longer than the portion 22.

It will be apparent that the drive pin 10 may be of any selected length, its shank suitably being of a diameter to be frictionally held within the guide bore 20 axially formed in the collar 22 of the cup 12. Moreover, the cup may itself be of different hardness than the pin 10 and have any desired configuration for supporting a particular load. As shown in FIGS. 2 and 3 the cup 12 is transversely bored as at 18 to subsequently receive a wire Y (FIG. 3) having its ends depending and wrapped to support a structure (not shown). Preferably the holes 18 are axially elongated so as to facilitate insertion of the wire through one side and lining it up with the other side.

The fastener being described is particularly well adapted for installation by an explosively actuated tool of the type generally designated 24 in FIG. 1. For this purpose the fastener is inserted head first into the mouth of a muzzle adaptor 26. Preferably a reduced bore of the adaptor 26 snugly receives the head 14 of the pin 10. In bringing the muzzle end of the tool to bear on the surface of a work piece W into which the fastener is to be driven, the adaptor 26 preferably is relatively retracted to cock the tool in order that a ram 28 may be positioned to be axially driven against the head 14 when a charge is exploded. As illustrated in FIG. 3, driving movement of the ram 28 impacts the head 14 axially to drive the pin 10 through the collar 22 until the latter is internally engaged by the underside of the head 14. An impact tool of the type indicated and employing a primerless low explosive charge is disclosed, for example, in a copending application for United States Letters Patent Ser. No. 593,144, filed Nov. 9, 1966, in the names of Robert C. Kvavle et al.

Impact of the driver 28 on the head 14 telescopically drives the pin 10 into the work piece W and simultaneously causes an end of the collar 22 to engage the work. The relative advancement of the ribs or serrations 16 axially through the collar 22 radially deforms it as shown in FIG. 4 to lock the cup 12 against relative rotation. If preferred, merely one or two axial projections 16 can be provided on the stem to effect locking of the cup 12 against rotation. Thus non-rotation of the installed cup is particularly useful in that an operator may, for instance, twist the ends of the wire Y together or otherwise secure articles thereto while the cup 12 is anchored. In the event the fastener is not fully driven into the work piece, the cup 12 is nevertheless held by the ribs 16 against rotation. A further advantageous feature is that in the event of an overdrive of the fastener, as sometimes happens because of reduced resistance in a locality of the work piece or because of extra strength in the explosive charge employed, the collar 22 acts as a buffer for the excessive driving energy.

Having thus described my invention, what I claim as new and desire to secure by Letters Patent of the United States is:

1. A two-part fastener adapted to be explosively driven into a work piece comprising a cup-shaped member having an apertured work engageable collar of reduced internal diameter at the leading end thereof, and a drive pin at least as long as said member, said pin having a shank a forward portion of which is telescoped in slidable frictional engagement with the collar and extends through its aperture and a flat driving head of a diameter larger than said reduced internal diameter but less than the remaining diameter of said cup-shaped member so as to be driven into the member to be engageable internally with the member adjacent said collar, said shank having at least one longitudinal radial projection extending substantially from the head a distance greater than the length of said collar, the distance from said radial projection to said head being less than the axial extent of said collar so as to be operative, upon relative axial driving movement of the member and the pin, radially to deform and lock with said apertured collar and the work piecee whereby the member and the pin are anchored in non-rotary relation with respect to each other and with respect to the work piece.

2. A fastener as set forth in claim 1 wherein the flat drive pin head is of a smooth configuration corresponding largely to the internal cross sectional shape of the member, and the underside of the head and that portion of the shank immediately adjoining the head substantially conforms to the internal shape of the member adjacent to the collar aperture.

References Cited

UNITED STATES PATENTS

| 2,455,825 | 12/1948 | Temple. |
| 2,954,717 | 10/1960 | Henning et al. |

FOREIGN PATENTS

| 184,524 | 1/1956 | Austria. |
| 567,464 | 5/1958 | Belgium. |
| 1.072,131 | 6/1967 | Great Britain. |
| 1,453,611 | 8/1960 | France. |

CARL W. TOMLIN, Primary Examiner

RAMON S. BRITTS, Assistant Examiner

U.S. Cl. X.R.

248—216